United States Patent
Zhou

(10) Patent No.: US 11,956,054 B2
(45) Date of Patent: Apr. 9, 2024

(54) METHOD AND APPARATUS FOR ADJUSTING ANTENNA MODULE, AND STORAGE MEDIUM

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 518 days.

(21) Appl. No.: 17/266,307

(22) PCT Filed: Aug. 10, 2018

(86) PCT No.: PCT/CN2018/100078
§ 371 (c)(1),
(2) Date: Feb. 5, 2021

(87) PCT Pub. No.: WO2020/029290
PCT Pub. Date: Feb. 13, 2020

(65) Prior Publication Data
US 2021/0306062 A1 Sep. 30, 2021

(51) Int. Cl.
*H04B 7/08* (2006.01)
*H01Q 1/24* (2006.01)
*H04B 7/06* (2006.01)

(52) U.S. Cl.
CPC .......... *H04B 7/0814* (2013.01); *H01Q 1/243* (2013.01); *H04B 7/0608* (2013.01)

(58) Field of Classification Search
CPC ..... H04B 7/0814; H04B 7/0608; H01Q 1/243

USPC .................................................. 455/452.1
See application file for complete search history.

(56) References Cited

U.S. PATENT DOCUMENTS

| | | | |
|---|---|---|---|
| 2013/0053050 A1 | 2/2013 | Kang et al. | |
| 2015/0173094 A1* | 6/2015 | Vangala | H04W 72/56 370/329 |
| 2018/0063693 A1 | 3/2018 | Chakraborty et al. | |
| 2018/0145742 A1 | 5/2018 | Li et al. | |

(Continued)

FOREIGN PATENT DOCUMENTS

| | | |
|---|---|---|
| CN | 101674642 A | 3/2010 |
| CN | 101676462 A | 3/2010 |
| CN | 102571178 A | 7/2012 |

(Continued)

OTHER PUBLICATIONS

Europe Partial Supplementary European Search Report in Application No. 18929423.4, dated Mar. 7, 2022.

(Continued)

*Primary Examiner* — Joel Ajayi
(74) *Attorney, Agent, or Firm* — Syncoda LLC; Feng Ma

(57) ABSTRACT

A method for adjusting an antenna module can be applied to a terminal and include: transmitting, to a base station, the sending capability information of at least one antenna module of the terminal and/or the receiving capability information of at least one antenna module of the terminal; and according to a control signaling transmitted by the base station, controlling at least one antenna module of the terminal to work or stop working. Transmission efficiency of the terminal can therefore be improved, or be maintained while saving the power consumption of the terminal.

10 Claims, 9 Drawing Sheets

(56) References Cited

U.S. PATENT DOCUMENTS

2019/0181942 A1* 6/2019 Tang ................... H04L 5/0057

FOREIGN PATENT DOCUMENTS

| | | | |
|---|---|---|---|
| CN | 105429682 | A | 3/2016 |
| CN | 106817156 | A | 6/2017 |
| CN | 106954241 | A | 7/2017 |
| CN | 107317608 | A | 11/2017 |
| CN | 107769833 | A | 3/2018 |
| CN | 107888255 | A | 4/2018 |
| WO | 2016029485 | A1 | 3/2016 |
| WO | 2018014323 | A2 | 1/2018 |

OTHER PUBLICATIONS

China 2nd Office Action in application No. 201880001324.3, dated Oct. 9, 2021.
3GPP TSG-RAN WG4 Meeting #86-bis, Melbourne, Australia, Apr. 16-20, 2018; How to distinguish UE types in FR2 (R4-1804364)—XP051431240.
1st Office Action in China Application No. 201880001324.3 (CNOA1) dated Mar. 19, 2021.
International Search Report in Application No. PCT/CN2018/100078, dated Apr. 28, 2019.

* cited by examiner

METHOD AND APPARATUS FOR ADJUSTING ANTENNA MODULE, AND STORAGE MEDIUM

CROSS-REFERENCE TO RELATED APPLICATIONS

The present application is a national stage of International Application No. PCT/CN2018/100078 filed on Aug. 10, 2018, the disclosure of which is hereby incorporated by reference in its entirety.

TECHNICAL FIELD

The present disclosure relates to the field of communication technology, and in particular, to a method, an apparatus for adjusting an antenna module and a storage medium.

BACKGROUND

In related technologies, 5G NR (New Radio) has developed many new frequencies for data transmission, for example, millimeter waves (mm wave). To realize high-frequency transmission such as millimeter waves on mobile terminals, it is often required to set a plurality of millimeter wave antenna modules at edges of the mobile terminal. From the perspective of the mobile terminal, setting a plurality of antenna modules can provide high EIRP (Effective Isotropic Radiated Power) and achieve a wide receiving coverage. However, due to small internal space of the mobile terminal, it is difficult to set many antenna modules. In addition, when the data amount of the antenna modules working in the mobile terminal is large, the power consumption of the mobile terminal is also large.

SUMMARY

In order to overcome problems in the related art, the present disclosure provides a method, an apparatus for adjusting an antenna module and a storage medium.

According to one aspect of the present disclosure, there is provided a method for adjusting an antenna module, wherein the method is applied to a terminal and the method includes: transmitting sending capability information of at least one antenna module of the terminal and/or receiving capability information of at least one antenna module of the terminal to a base station; and controlling at least one antenna module of the terminal to work or stop working based on a control signaling sent by the base station.

Optionally, the sending capability information includes at least one of following sending capability indicators: a peak value of Effective Isotropic Radiated Power EIRP, an average value of the EIRP, a minimum value of the EIRP, an average value of Total Radiated Power TRP, and a minimum value of the TRP.

Optionally, the receiving capability information includes at least one of following receiving capability indicators: a spherical coverage rate, a base station transmitting power corresponding to the spherical coverage rate, an average value of Total Isotropic Sensitivity TIS, and a minimum value of the TIS.

Optionally, the method further includes: sending information of an antenna module assembly of the terminal to the base station, wherein the antenna module assembly includes at least two antenna modules of the terminal.

Optionally, the controlling at least one antenna module of the terminal to work or stop working based on a control signaling sent by the base station includes: controlling an antenna module identified by a first identifier to work or stop working according to the first identifier of the antenna module indicated in the control signaling, or controlling at least one antenna module in the antenna module assembly identified by a second identifier to work or stop working according to the second identifier of the antenna module indicated in the control signaling.

According to a second aspect of the present disclosure, there is provided a method for adjusting an antenna module, wherein the method is applied to a base station and the method includes: receiving sending capability information of at least one antenna module of a terminal and/or receiving capability information of at least one antenna module of the terminal; and notifying the terminal to control at least one antenna module of the terminal to work or stop working according to the sending capability information and/or the receiving capability information, or adjusting service data scheduled to a target frequency band according to the sending capability information and/or the receiving capability information.

Optionally, the sending capability information includes at least one of following sending capability indicators: a peak value of Effective Isotropic Radiated Power EIRP, an average value of the EIRP, a minimum value of the EIRP, an average value of Total Radiated Power TRP, and a minimum value of the TRP.

Optionally, the receiving capability information includes at least one of following receiving capability indicators: a spherical coverage rate, a base station transmitting power corresponding to the spherical coverage rate, an average value of Total Isotropic Sensitivity TIS, and a minimum value of the TIS.

Optionally, the notifying the terminal to control at least one antenna module of the terminal to work or stop working includes: sending a control signaling to the terminal, wherein the control signaling indicates a first identifier of an antenna module of the terminal and that the antenna module identified by the first identifier needs to work or stop working, or the control signaling indicates a second identifier of an antenna module assembly of the terminal and that at least one antenna module in the antenna module assembly identified by the second identifier needs to work or stop working.

Optionally, the notifying the terminal to control at least one antenna module of the terminal to work or stop working according to the sending capability information and/or the receiving capability information includes: notifying the terminal to control at least one antenna module with the lowest preset priority in the terminal to stop working, when it is determined that a transmission capability of the terminal is higher than a threshold according to the sending capability information and/or the receiving capability information; notifying the terminal to control at least one antenna module with the highest preset priority in the terminal to work, when it is determined that the transmission capability of the terminal is not higher than the threshold according to the sending capability information and/or the receiving capability information.

Optionally, the notifying the terminal to control at least one antenna module of the terminal to work or stop working according to the sending capability information and/or the receiving capability information includes: determining a data throughput of the terminal corresponding to each antenna module of the terminal according to the sending capability information and the receiving capability information; determining a first antenna module that needs to work in the terminal according to a data amount of service data currently to be transmitted by the terminal and the data throughput of the terminal corresponding to each antenna module; notifying the terminal to control the first antenna module to work.

Optionally, the notifying the terminal to control at least one antenna module of the terminal to work or stop working according to the sending capability information and/or the receiving capability information includes: determining a coverage capability corresponding to each antenna module of the terminal according to the receiving capability information; determining a second antenna module that needs to work in the terminal according to a coverage capability required by an operator corresponding to a service currently performed by the terminal and the coverage capability corresponding to each antenna module; notifying the terminal to control the second antenna module to work.

Optionally, the adjusting service data scheduled to a target frequency band according to the sending capability information and/or the receiving capability information includes: determining a service carrying capability of each antenna module of the terminal according to the sending capability information and/or the receiving capability information; increasing or decreasing a data amount of the service data scheduled to the target frequency band corresponding to the antenna module according to the service carrying capability of each antenna module.

According to a third aspect of the present disclosure, there is provided an apparatus for adjusting an antenna module, wherein the apparatus is applied to a terminal and the apparatus includes: a first sending module, configured to transmit sending capability information of at least one antenna module of the terminal and/or receiving capability information of at least one antenna module of the terminal to a base station; and a control module, configured to control at least one antenna module of the terminal to work or stop working based on a control signaling sent by the base station.

Optionally, the sending capability information includes at least one of following sending capability indicators: a peak value of Effective Isotropic Radiated Power EIRP, an average value of the EIRP, a minimum value of the EIRP, an average value of Total Radiated Power TRP, and a minimum value of the TRP.

Optionally, the receiving capability information includes at least one of following receiving capability indicators: a spherical coverage rate, a base station transmitting power corresponding to the spherical coverage rate, an average value of Total Isotropic Sensitivity TIS, and a minimum value of the TIS.

Optionally, the apparatus further includes: a second sending module, configured to send information of an antenna module assembly of the terminal to the base station, wherein the antenna module assembly includes at least two antenna modules of the terminal.

Optionally, the control module is configured to: control an antenna module identified by a first identifier to work or stop working according to the first identifier of the antenna module indicated in the control signaling, or control at least one antenna module in the antenna module assembly identified by a second identifier to work or stop working according to the second identifier of the antenna module indicated in the control signaling.

According to a fourth aspect of the present disclosure, there is provided an apparatus for adjusting an antenna module, wherein the apparatus is applied to a base station and the apparatus includes: a first receiving module, configured to receive sending capability information of at least one antenna module of a terminal and/or receiving capability information of at least one antenna module of the terminal; and a notifying module, configured to notify the terminal to control at least one antenna module of the terminal to work or stop working according to the sending capability information and/or the receiving capability information, or adjust service data scheduled to a target frequency band according to the sending capability information and/or the receiving capability information.

Optionally, the sending capability information includes at least one of following sending capability indicators: a peak value of Effective Isotropic Radiated Power EIRP, an average value of the EIRP, a minimum value of the EIRP, an average value of Total Radiated Power TRP, and a minimum value of the TRP.

Optionally, the receiving capability information includes at least one of following receiving capability indicators: a spherical coverage rate, a base station transmitting power corresponding to the spherical coverage rate, an average value of Total Isotropic Sensitivity TIS, and a minimum value of the TIS.

Optionally, the notifying module is configured to: send a control signaling to the terminal, wherein the control signaling indicates a first identifier of an antenna module of the terminal and that the antenna module identified by the first identifier needs to work or stop working, or the control signaling indicates a second identifier of an antenna module assembly of the terminal and that at least one antenna module in the antenna module assembly identified by the second identifier needs to work or stop working.

Optionally, the notifying module is configured to: notify the terminal to control at least one antenna module with the lowest preset priority in the terminal to stop working, when it is determined that a transmission capability of the terminal is higher than a threshold according to the sending capability information and/or the receiving capability information; notify the terminal to control at least one antenna module with the highest preset priority in the terminal to work, when it is determined that the transmission capability of the terminal is not higher than the threshold according to the sending capability information and/or the receiving capability information.

Optionally, the notifying module includes: a first notifying sub-module, configured to determine a data throughput of the terminal corresponding to each antenna module of the terminal according to the sending capability information and the receiving capability information; a first determining sub-module, configured to determine a first antenna module that needs to work in the terminal according to a data amount of service data currently to be transmitted by the terminal and the data throughput of the terminal corresponding to each antenna module; a second notifying sub-module, configured to notify the terminal to control the first antenna module to work.

Optionally, the notifying module includes: a second determining sub-module, configured to determine a coverage capability corresponding to each antenna module of the terminal according to the receiving capability information; a third determining sub-module, configured to determine a second antenna module that needs to work in the terminal according to a coverage capability required by an operator corresponding to a service currently performed by the terminal and the coverage capability corresponding to each antenna module; a third notifying sub-module, configured to notify the terminal to control the second antenna module to work.

Optionally, the notifying module includes: a fourth determining sub-module, configured to determine a service carrying capability of each antenna module of the terminal according to the sending capability information and/or the receiving capability information; an adjusting sub-module, configured to increase or decrease a data amount of the service data scheduled to the target frequency band corresponding to the antenna module according to the service carrying capability of each antenna module.

According to a fifth aspect of the present disclosure, there is provided an apparatus for adjusting an antenna module, wherein the apparatus is applied to a terminal and the apparatus includes: a processor; and memory for storing instructions executable by the processor, wherein the processor is configured to:

transmit sending capability information of at least one antenna module of the terminal and/or receiving capability information of at least one antenna module of the terminal to a base station; and control at least one antenna module of the terminal to work or stop working based on a control signaling sent by the base station.

According to a sixth aspect of the present disclosure, there is provided a non-transitory computer-readable storage medium, wherein instructions in the storage medium enables a processor to perform the method according to the first aspect of the present disclosure.

According to a fifth aspect of the present disclosure, there is provided an apparatus for adjusting an antenna module, wherein the apparatus is applied to a base station and the apparatus includes: a processor; and memory for storing instructions executable by the processor, wherein the processor is configured to:

receive sending capability information of at least one antenna module of a terminal and/or receiving capability information of at least one antenna module of the terminal; and notify the terminal to control at least one antenna module of the terminal to work or stop working according to the sending capability information and/or the receiving capability information, or adjust service data scheduled to a target frequency band according to the sending capability information and/or the receiving capability information.

According to an eighth aspect of the present disclosure, there is provided a non-transitory computer-readable storage medium, wherein instructions in the storage medium enables a processor to perform the method according to the second aspect of the present disclosure.

The technical solutions provided by the embodiments of the present disclosure may include the following beneficial effects.

Through the method for adjusting an antenna module provided in this embodiment, sending capability information and/or receiving capability information of at least one antenna module of the terminal are transmitted to a base station, such that the base station can determine the antenna module that needs to work in the terminal according to at least one of the information, to notify the terminal to control at least one antenna module to work or stop working, which can achieve the purpose of adjusting the antenna module working in the terminal according to the transmission capability of the terminal, improve the transmission efficiency of the terminal, or save the power consumption of the terminal under the premise of ensuring the data transmission efficiency of the terminal.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the disclosure, illustrate embodiments consistent with the disclosure, and are used to explain the principle of the disclosure together with the specification.

DETAILED DESCRIPTION

Herein, exemplary embodiments will be described in detail, and examples thereof are shown in the accompanying drawings. When the following description refers to the accompanying drawings, unless otherwise indicated, the same numbers in different drawings represent the same or similar elements. The implementations described in the following exemplary embodiments do not represent all implementations consistent with the present disclosure. Rather, they are only examples of apparatuses and methods consistent with some aspects of the present disclosure as detailed in the appended claims.

Figure 1:
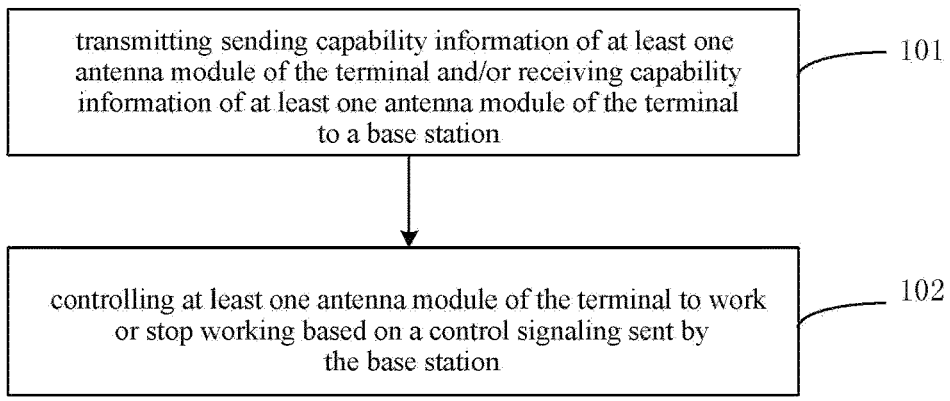
FIG. 1 is a flowchart showing a method for adjusting an antenna module according to an exemplary embodiment.

FIG. 1 is a flowchart showing a method for adjusting an antenna module according to an exemplary embodiment.

The method is applied to a terminal, that is, the method can be executed by the terminal. As shown in FIG. 1, the method includes following steps.

In step 101, sending capability information of at least one antenna module of the terminal and/or receiving capability information of at least one antenna module of the terminal are transmitted to a base station.

In an implementation, the terminal may transmit the sending capability information of at least one antenna module of the terminal and/or receiving capability information of at least one antenna module of the terminal to a base station every time it is initialized, for example, every time the terminal boots up.

In an implementation, the terminal may have a plurality of physical antenna modules, and at least one antenna module of the terminal may include: a certain physical antenna module in the terminal, one virtual antenna module simulated by at least two physical antenna modules in the terminal or an antenna module in an antenna module assembly of the terminal. When sending the sending capability information and/or receiving capability information of the at least one antenna module to the base station, the terminal may simultaneously send an identifier of the physical antenna module, an identifier of the virtual antenna module, or an identifier of the antenna module assembly, to the base station. One antenna module assembly may at least include two physical antenna modules or two virtual antenna modules.

In an implementation, when the terminal sends the sending capability information and/or receiving capability information of the antenna module to the base station, it may also simultaneously transmit an identifier of the terminal to the base station, so that the base station learns about the terminal to which the antenna module belongs.

In an implementation, the terminal may transmit the receiving capability information and the sending capability information of at least one antenna module of the terminal to the base station through a RRC (Radio Resource Control) signaling, an MAC (Medium/Media Access Control) CE (Control Element) signaling, or a physical layer signaling.

In step 102, at least one antenna module of the terminal is controlled to work or stop working based on a control signaling sent by the base station.

In an implementation, the control signaling sent by the base station may indicate at least one of the identifier of the physical antenna module in the antenna module, the identifier of the virtual antenna module, and the identifier of the antenna module assembly.

In an implementation, the control signaling sent by the base station may also indicate an operation that the terminal needs to perform on the antenna module indicated in the control signaling, such as an operation of controlling the antenna module to work or stop working.

Through the method for adjusting an antenna module provided in this embodiment, sending capability information and/or receiving capability information of at least one antenna module of the terminal are transmitted to a base station, such that the base station can determine the antenna module that needs to work in the terminal according to at least one of the information, to notify the terminal to control at least one antenna module to work or stop working, which can achieve the purpose of adjusting the antenna module working in the terminal according to the transmission capability of the terminal, improve the transmission efficiency of the terminal, or save the power consumption of the terminal under the premise of ensuring the data transmission efficiency of the terminal.

In an implementation, the sending capability information of the antenna module of the terminal may include at least one of following sending capability indicators: a peak value of EIRP, an average value of the EIRP, a minimum value of the EIRP, an average value of TRP, and a minimum value of the TRP. For example, these sending capability indicators of the antenna module of the terminal may be preset before the terminal leaves the factory. When the terminal transmits the sending capability information of at least one antenna module of the terminal to the base station, it may send at least one of the above sending capability indicators of the antenna module to the base station. For example, the sending capability information of at least one antenna module sent by the terminal to the base station may include an identifier of the antenna module, an identifier of the antenna module assembly, an identifier of the sending capability indicator, and a numerical value corresponding to the indicator.

In an implementation, the receiving capability information of the antenna module of the terminal may include at least one of following receiving capability indicators: a spherical coverage rate, a base station transmitting power corresponding to the spherical coverage rate, an average value of Total Isotropic Sensitivity TIS, and a minimum value of the TIS. For example, these sending capability indicators of the antenna module of the terminal may be preset before the terminal leaves the factory. The receiving capability information of at least one antenna module sent by the terminal to the base station may include the identifier of the antenna module, the identifier of the antenna module assembly, the identifier of the receiving capability indicator, and a numerical value corresponding to the indicator. In an embodiment, the spherical coverage rate is a percentage of an area of a region where the terminal can normally receive signals on a spherical surface centered by itself to a surface area of the spherical region, when the base station transmits signals with a certain transmitting power. The base station transmitting power corresponding to the spherical coverage rate is the corresponding transmitting power of the base station when the spherical coverage rate of the antenna module is constant. For example, when the base station transmits signals at 60 W, the spherical coverage rate of the antenna module 1 of the terminal is 80%, then the base station transmitting power corresponding to the spherical coverage rate of 80% is 60 W.

Figure 2:
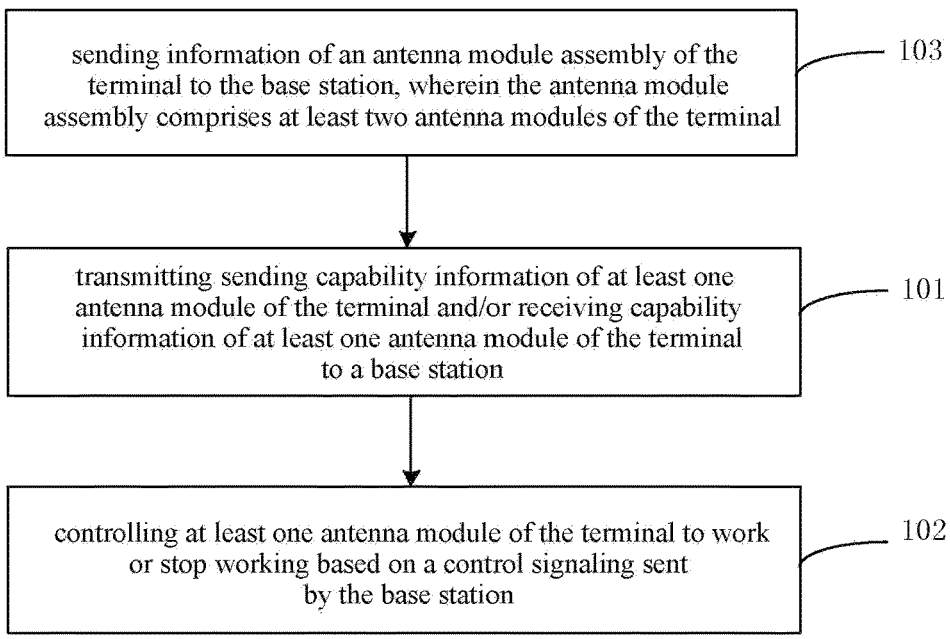
FIG. 2 is a flowchart showing a method for adjusting an antenna module according to an exemplary embodiment.

FIG. 2 is a flowchart showing a method for adjusting an antenna module according to an exemplary embodiment. As shown in FIG. 2, on the basis of FIG. 1, the method may include: in step 103, sending information of an antenna module assembly of the terminal to the base station, wherein the antenna module assembly includes at least two antenna modules of the terminal. For example, the antenna module assembly may include at least two physical antenna modules, or at least two virtual antenna modules, and the information of the antenna module assembly may include the identifier of the antenna modules included in the antenna module assembly. The terminal can send information about all possible combinations of antenna modules to the base station in advance. For example, it is assumed that the terminal includes four physical antenna modules: antenna module 1, antenna module 2, antenna module 3, and antenna module 4. The antenna module 1 is a main antenna module, and the antenna module 1 can be combined with any one of the four antenna modules as an antenna module assembly. It is assumed that the antenna module 2 can be combined with the antenna module 3 or the antenna module 4 in addition to the combination with the antenna module 1. The antenna module 3 can only be combined with the antenna module 2 in addition to the combination with the antenna module 1. The antenna module 4 can only be combined with the antenna module 2 in addition to the combination with the antenna module 1. Then, all possible antenna module assemblies of the terminal can include following five antenna module assemblies: three types of combinations of the antenna module 1 respectively with the other three antenna modules, the combination of the antenna module 2 with the antenna module 3, the combination of the antenna module 4 with the antenna module 2. The terminal can send the identifier of the five antenna module assemblies to the base station. In this way, when the base station receives the identifier of the antenna module assembly, it can learn about the antenna modules included in the assembly.

Figure 3:
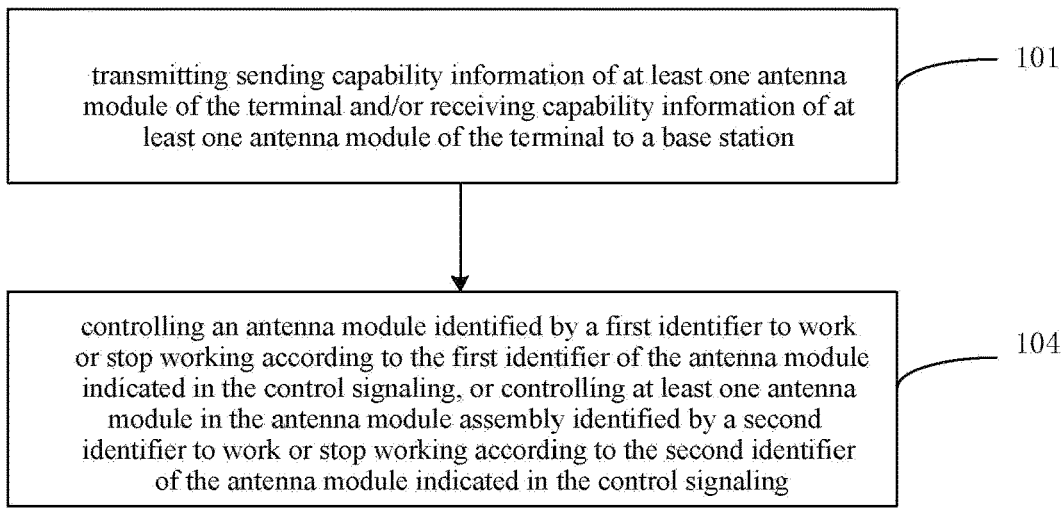
FIG. 3 is a flowchart showing a method for adjusting an antenna module according to an exemplary embodiment.

FIG. 3 is a flowchart of a method for adjusting an antenna module according to an exemplary embodiment. As shown in FIG. 3, in the method, the controlling at least one antenna module of the terminal to work or stop working based on a control signaling sent by the base station may include: in step 104, controlling an antenna module identified by a first identifier to work or stop working according to the first identifier of the antenna module indicated in the control signaling, or controlling at least one antenna module in the antenna module assembly identified by a second identifier to work or stop working according to the second identifier of the antenna module indicated in the control signaling. For example, the control signaling sent by the base station to the terminal includes the identifier B of an antenna module assembly, the assembly includes the antenna module 1 and antenna module 2, and the operation included in the control signaling that the terminal needs to perform on the antenna module 1 and the antenna module 2 is to control the antenna module 1 and the antenna module 2 to work. Then, if the antenna module 1 and the antenna module 2 of the current terminal are in a non-working state, the terminal will control the antenna module 1 and the antenna module 2 to start to work after receiving the control signaling sent by the base station. If the antenna module 1 of the current terminal is working and the antenna module 2 of the current terminal is not working, the terminal will keep the antenna module 1 working and control the antenna module 2 to start to work after receiving the control signaling sent by the base station. If the antenna module 1 and the antenna module 2 of the current terminal are both in a working state, the terminal will keep the antenna module 1 and the antenna module 2 working.

Figure 4:
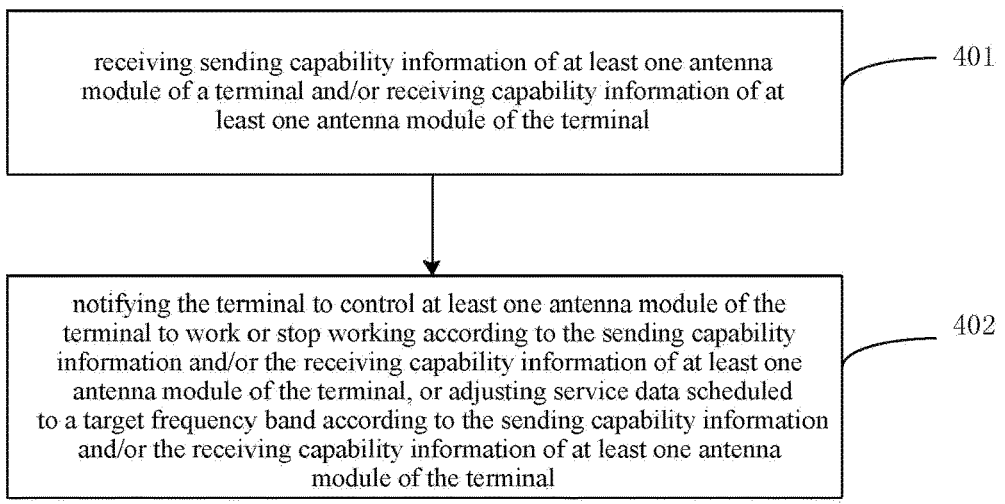
FIG. 4 is a flowchart showing a method for adjusting an antenna module according to an exemplary embodiment.

FIG. 4 is a flowchart showing a method for adjusting an antenna module according to an exemplary embodiment. The method is applied to a base station, that is, the method can be executed by the base station. As shown in FIG. 4, the method includes following steps.

Step 401: sending capability information of at least one antenna module of a terminal and/or receiving capability information of at least one antenna module of the terminal are received.

In an implementation, the sending capability information or the receiving capability information of at least one antenna module of the terminal received by the base station may include the sending capability information and/or receiving capability information of a certain physical antenna module, a virtual antenna module of the terminal, or the antenna modules in the antenna module assembly of the terminal, so the sending capability information and the receiving capability information may also include at least one of an identifier of the physical antenna module, an identifier of the virtual antenna module, and an identifier of the antenna module assembly.

Step 402: the terminal is notified to control at least one antenna module of the terminal to work or stop working according to the sending capability information and/or the receiving capability information of at least one antenna module of the terminal, or service data scheduled to a target frequency band is adjusted according to the sending capability information and/or the receiving capability information of at least one antenna module of the terminal.

In an implementation, the base station may send the control signaling to the terminal to notify the terminal to control at least one antenna module of the terminal to work or stop working. The control signaling may include an identifier of the antenna module that needs to be controlled to work or stop working, or an identifier of the antenna module assembly that needs to be controlled to work or stop working. The control signaling may also indicate an operation that the terminal needs to control the antenna module to perform, and the operation may include controlling the antenna module to work, or controlling the antenna module to stop working.

In an implementation, the base station can notify the terminal to control at least one antenna module of the terminal to work or stop working through a broadcast signaling, a RRC signaling, an MAC CE signaling, or a physical layer signaling.

In an implementation, adjusting the service data scheduled to the target frequency band may include increasing the data amount of the service data of the designated service scheduled to the target frequency band, reducing the data amount of the service data of the designated service scheduled to the target frequency band, and scheduling the service data of a certain designated service to the target frequency band, or cancelling the designated service data scheduled to the target frequency band. In an embodiment, the target frequency band may be a frequency band where at least one antenna module of the terminal works.

In the method for adjusting the antenna module provided in this embodiment, the base station determines the antenna module that needs to work in the terminal according to the sending capability information and/or receiving capability information of at least one antenna module of the terminal, and notifies the terminal to control the at least one antenna module to work or stop working, so as to achieve the purpose of adjusting the antenna module working in the terminal according to the transmission capability of the terminal, improve the transmission efficiency of the terminal, or save the power consumption of the terminal under the premise of ensuring the data transmission efficiency of the terminal.

In an implementation, the sending capability information of at least one antenna module of the terminal received by the base station may include at least one of the following sending capability indicators: a peak value of EIRP, an average value of the EIRP, a minimum value of the EIRP, an average value of TRP, and a minimum value of the TRP. These sending capability indicators of the antenna module may be preset before the terminal leaves the factory. The sending capability information of at least one antenna module sent from the terminal received by the base station may include: the identifier of the antenna module, the identifier of the antenna module assembly, the identifier of the sending capability indicator of the antenna module, and the numerical value corresponding to the indicator.

In an implementation, the receiving capability information of the antenna module of the terminal received by the base station includes at least one of the following receiving capability indicators: a spherical coverage rate, a base station transmitting power corresponding to the spherical coverage rate, an average value of Total Isotropic Sensitivity TIS, and a minimum value of the TIS. These receiving capability indicators of the antenna module may be preset before the terminal leaves the factory. Therefore, the receiving capability information of at least one antenna module sent by the terminal received by the base station may include: the identifier of the antenna module, the identifier of the antenna module assembly, the identifier of the receiving capability indicator of the antenna module, and the numerical value corresponding to the indicator.

Figure 5:
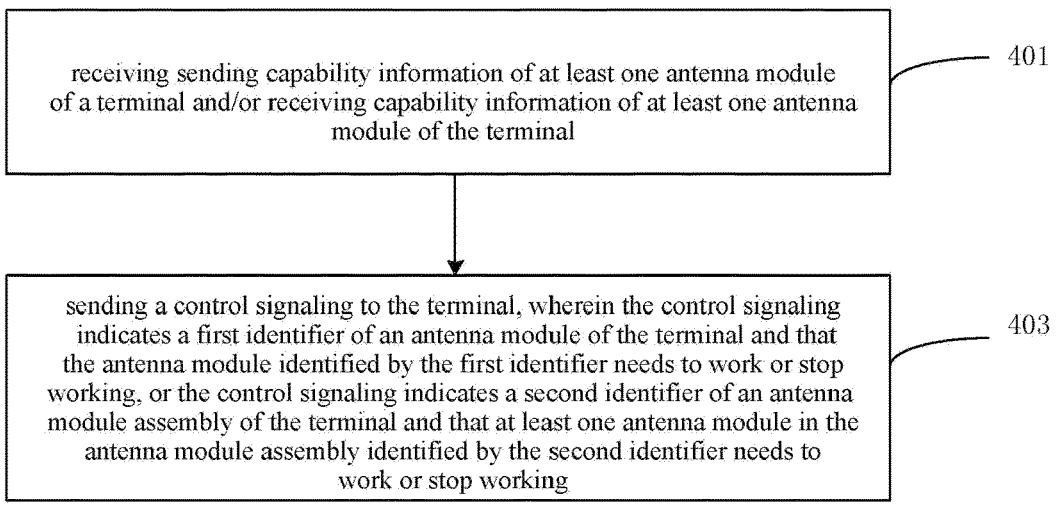
FIG. 5 is a flowchart showing a method for adjusting an antenna module according to an exemplary embodiment.

FIG. 5 is a flowchart showing a method for adjusting an antenna module according to an exemplary embodiment. As shown in FIG. 5, in the method, the notifying the terminal to control at least one antenna module of the terminal to work or stop working may include: in step 403, sending a control signaling to the terminal, wherein the control signaling indicates a first identifier of an antenna module of the terminal and that the antenna module identified by the first identifier needs to work or stop working, or the control signaling indicates a second identifier of an antenna module assembly of the terminal and that at least one antenna module in the antenna module assembly identified by the second identifier needs to work or stop working. For example, a digital number can be used as the identifier of the antenna module, "on" means that the antenna module is controlled to work, "off" means that the antenna module is controlled to stop working. When the control signaling sent by the base station to the terminal includes on, 1, and 2, it means that the base station instructs the terminal to control antenna modules with the identifier 1 and the identifier 2 to start to work. When the control signaling sent by the base station to the terminal includes off, 3, and 4, it means that the base station instructs the terminal to control antenna modules with the identifier 3 and the identifier 4 to stop working. In addition, characters can also be used as the identifier of the antenna module assembly. "On" is used to mean controlling the antenna modules in the antenna module assembly to work, and "off" is used to mean controlling the antenna modules in the antenna module assembly to stop working. It is assumed that the antenna module assembly A includes the antenna module 1 and the antenna module 2. When the control signaling sent from the base station to the terminal includes off and A, it means that the base station instructs the terminal to control the antenna module 1 and the antenna module 2 in the antenna module assembly with the identifier A to stop working.

Figure 6:
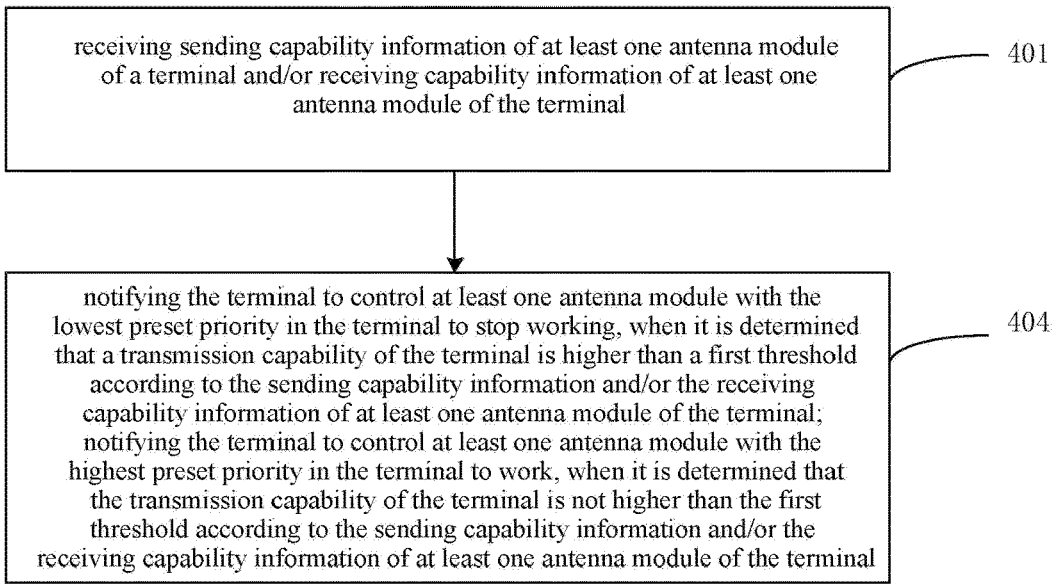
FIG. 6 is a flowchart showing a method for adjusting an antenna module according to an exemplary embodiment.

FIG. 6 is a flowchart showing a method for adjusting an antenna module according to an exemplary embodiment. As shown in FIG. 6, in the method, the notifying the terminal to control at least one antenna module of the terminal to work or stop working according to the sending capability information and/or the receiving capability information of at least one antenna module of the terminal may include: in step 404, notifying the terminal to control at least one antenna module with the lowest preset priority in the terminal to stop working, when it is determined that a transmission capability of the terminal is higher than a threshold according to the sending capability information and/or the receiving capability information of at least one antenna module of the terminal; notifying the terminal to control at least one antenna module with the highest preset priority in the terminal to work, when it is determined that the transmission capability of the terminal is not higher than the threshold according to the sending capability information and/or the receiving capability information of at least one antenna module of the terminal. In the embodiment, the transmission capability of the terminal may include the sending capability of the terminal and the receiving capability of the terminal. The sending capability of the terminal may be the sum of the sending capabilities of all physical antenna modules of the terminal, and the receiving capability of the terminal may be the sum of the receiving capabilities of all physical antenna modules of the terminal. In the method of this embodiment, the terminal can also be notified to adjust the antenna module according to the weighted value of the sending capability and the receiving capability of the terminal. When it is determined that the weighted value of the sending capability and the receiving capability of the terminal is higher than the threshold based on the sending capability information and receiving capability information of at least one antenna module of the terminal, the terminal is notified to control at least one antenna module in the terminal to work. When it is determined that the weighted value of the sending capability of the terminal and the receiving capability of the terminal is not higher than the threshold based on the sending capability information and receiving capability information of at least one antenna module of the terminal, the terminal is notified to control at least one antenna module in the terminal to stop working. In the embodiment, the weighted value of the sending capability and the receiving capability of the terminal is obtained by multiplying corresponding weighted values with the sending capability of the terminal and the receiving capability of the terminal respectively, and then performing the summing. For example, the sending capability of the terminal is a, the receiving capability of the terminal is b, the weight corresponding to a is TRP, and the weight corresponding to b is TIS, then the weighted value of the sending capability and receiving capability of the terminal is $a \times TRP + b \times TIS$.

The above-mentioned preset priority can be set according to the transmission capability of the antenna module. For example, it can be set according to a positive correlation between the preset priority and the transmission capability of the antenna module. That is, the stronger the transmission capability of the antenna module is, the higher the preset priority of the antenna module is, on the contrary, the weaker the transmission capability of the antenna module is, the lower the preset priority of the antenna module is. In the embodiment, the transmission capability of the antenna module may include the receiving capability of the antenna module and the sending capability of the antenna module.

The above threshold can be set by an operator, or by the base station according to a network deployment situation of a certain network coverage region.

The transmission capability of the antenna module may include the sending capability of the antenna module and the receiving capability of the antenna module. The above sending capability indicator of the at least one antenna module may be used to calculate the sending capability of the antenna module. The above receiving capability indicator of at least one antenna module may be used to calculate the receiving capability of the antenna module. The sending capability and receiving capability of the antenna module can be measured by the data throughput of the terminal corresponding to the antenna module, and at least one of the above receiving capability indicators and the sending capability indicators of the antenna module can be used to calculate the throughput of the terminal corresponding to the antenna module. The receiving capability of the antenna module can be measured by the coverage capability of the antenna module, and the coverage capability of the antenna module can be calculated by using at least one of the above receiving capability indicators of the antenna module. As for the data throughput of the terminal corresponding to the antenna module, it is assumed that only the antenna module 2 in the terminal is working currently and the data throughput of the terminal is 100 Mbps, then the data throughput of the terminal corresponding to the antenna module 2 is 100 Mbps. The coverage capability of the antenna module can be measured by the spherical coverage rate of the antenna module, and the spherical coverage rate of the antenna module corresponds to the transmitting power of transmitting signals of the base station. It is assumed that the base station currently transmits signals with a transmitting power of 40 W, the spherical coverage rate of the antenna module 2 is 80% when the base station transmitting power is 40 W, then the coverage capability of the antenna module 2 is 80%.

Figure 7:
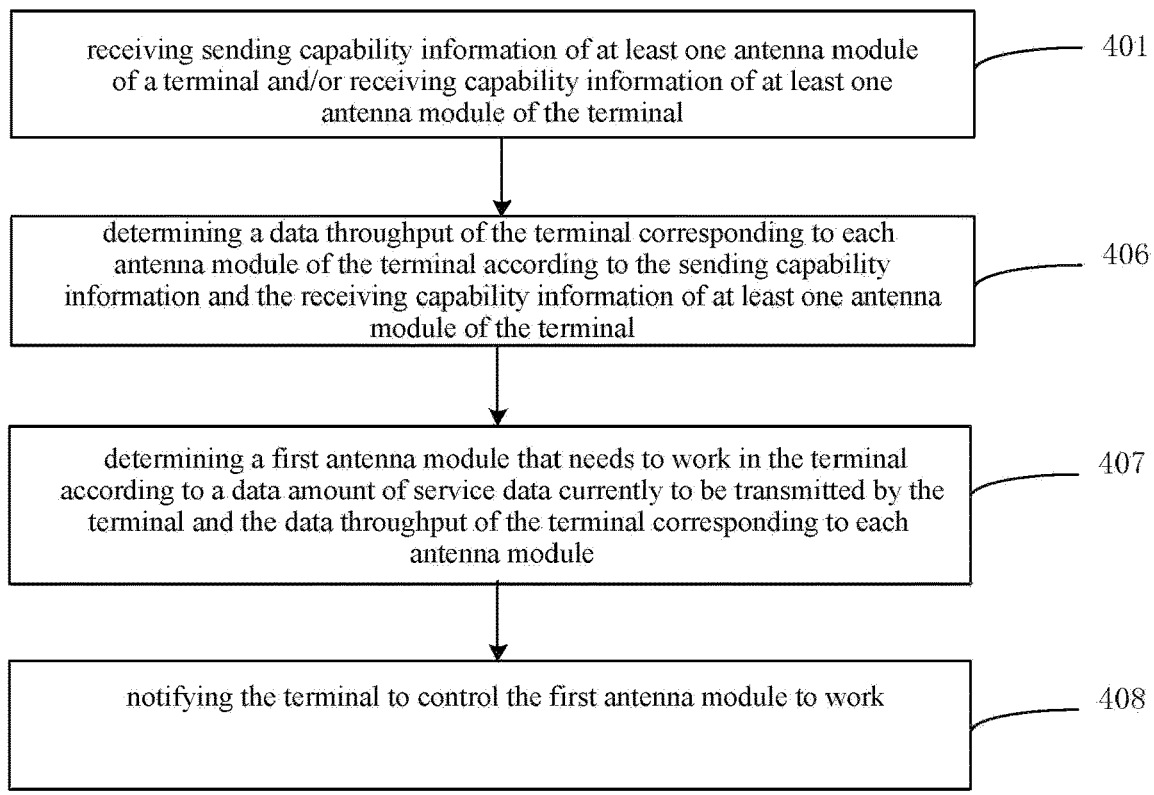
FIG. 7 is a flowchart showing a method for adjusting an antenna module according to an exemplary embodiment.
Figure 8:
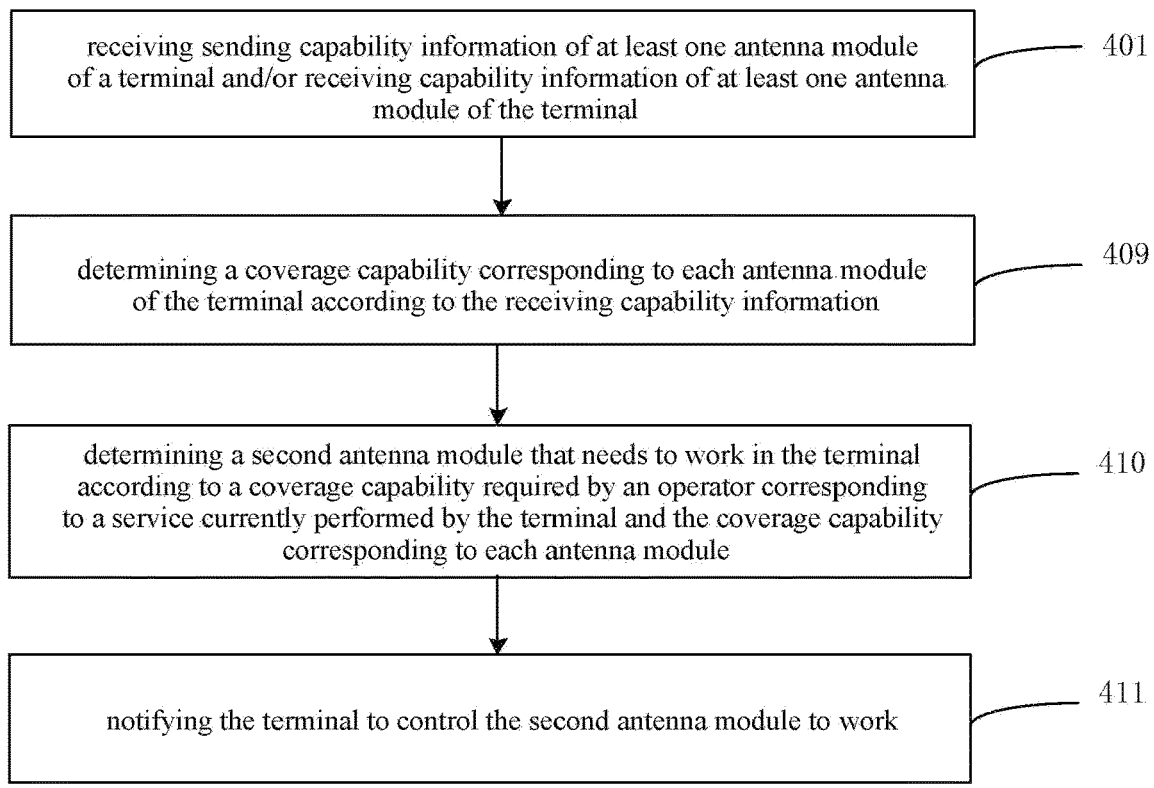
FIG. 8 is a flowchart showing a method for adjusting an antenna module according to an exemplary embodiment.

FIG. 7 is a flowchart showing a method for adjusting an antenna module according to an exemplary embodiment. As shown in FIG. 7, in the method, the notifying the terminal to control at least one antenna module of the terminal to work or stop working according to the sending capability information and/or the receiving capability information of at least one antenna module of the terminal may include: in step 406, determining a data throughput of the terminal corresponding to each antenna module of the terminal according to the sending capability information and the receiving capability information of at least one antenna module of the terminal; in step 407, determining a first antenna module that needs to work in the terminal according to a data amount of service data currently to be transmitted by the terminal and the data throughput of the terminal corresponding to each antenna module; in step 408, notifying the terminal to control the first antenna module to work. For example, it is assumed that the data throughput of the terminal corresponding to antenna module 3 is 100 Mbps, and the data throughput of the terminal corresponding to antenna module 4 is 150 Mbps. When the throughput required for the terminal to transmit service data is less than 100 Mbps, the terminal can be notified to control the antenna module 3 to work. When the throughput required for the terminal to transmit service data is 120 Mbps, the terminal can be notified to control the antenna module 4 to work. When the throughput required for the terminal to transmit service data is 180 Mbps, the terminal can be notified to control the antenna module 3 and the antenna module 4 to work FIG. 8 is a flowchart showing a method for adjusting an antenna module according to an exemplary embodiment. As shown in FIG. 8, in the method, the notifying the terminal to control at least one antenna module of the terminal to work or stop working according to the sending capability information and/or the receiving capability information of at least one antenna module of the terminal may include: in step 409, determining a coverage capability corresponding to each antenna module of the terminal according to the receiving capability information; in step 410, determining a second antenna module that needs to work in the terminal according to a coverage capability required by an operator corresponding to a service currently performed by the terminal and the coverage capability corresponding to each antenna module; in step 411, notifying the terminal to control the second antenna module to work. For example, it is assumed that the antenna module 5 can provide the spherical coverage rate of 10%, and the antenna module 6 can provide the spherical coverage rate of 5%. When the spherical coverage rate required by the operator is 4%, the terminal can be notified to control the antenna module 6 to work. When the spherical coverage rate required by the operator is 12%, the terminal can be notified to control the antenna module 5 and the antenna module 6 to work.

Figure 9:
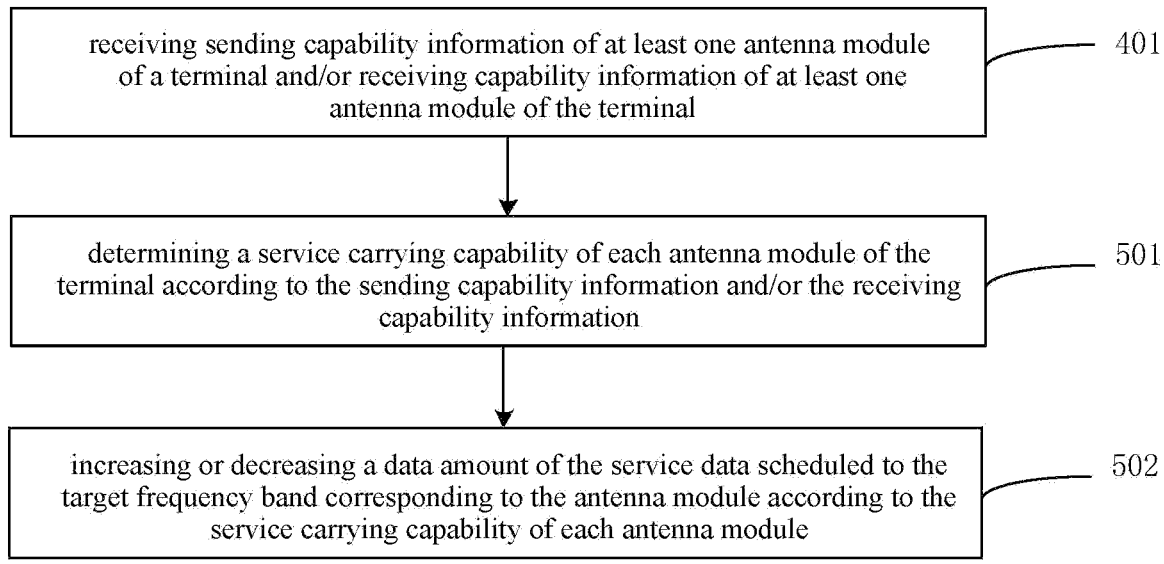
FIG. 9 is a flowchart showing a method for adjusting an antenna module according to an exemplary embodiment.

FIG. 9 is a flowchart showing a method for adjusting an antenna module according to an exemplary embodiment. As shown in FIG. 9, the adjusting service data scheduled to a target frequency band according to the sending capability information and/or the receiving capability information may include:

in step 501, determining a service carrying capability of each antenna module of the terminal according to the sending capability information and/or the receiving capability information; in step 502, increasing or decreasing a data amount of the service data scheduled to the target frequency band corresponding to the antenna module according to the service carrying capability of each antenna module. For example, when the base station determines that the terminal's receiving capability and sending capability in the millimeter wave band are good based on the sending capability information and receiving capability information of the millimeter wave antenna modules, the base station can schedule the sending and receiving of more millimeter wave service data to the millimeter wave band. When the base station determines that the terminal's receiving capability and sending capability in the millimeter wave band are poor based on the sending capability information and receiving capability information of the millimeter wave antenna modules, the base station can reduce the service data scheduled the to the millimeter wave antenna modules, or even no longer schedules service data to the millimeter wave band, or the base station can directly notify the terminal to turn off the millimeter wave antenna modules.

Figure 10:
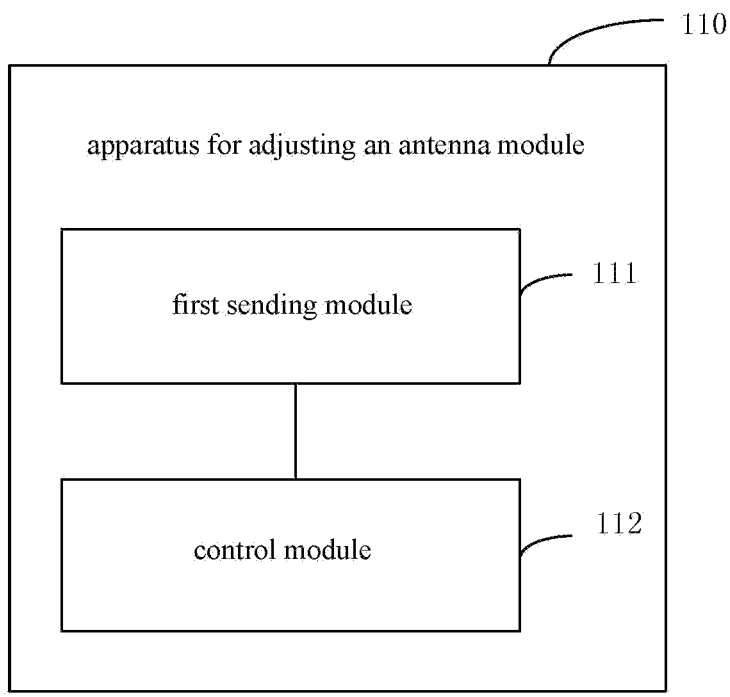
FIG. 10 is a block diagram showing an apparatus for adjusting an antenna module according to an exemplary embodiment.

FIG. 10 is a block diagram showing an apparatus for adjusting an antenna module according to an exemplary embodiment. The apparatus is applied to a terminal and as shown in FIG. 10, the apparatus 110 includes:

a first sending module 111, configured to transmit sending capability information of at least one antenna module of the terminal and/or receiving capability information of at least one antenna module of the terminal to a base station; and a control module 112, configured to control at least one antenna module of the terminal to work or stop working based on a control signaling sent by the base station.

In an implementation, the sending capability information includes at least one of following sending capability indicators: a peak value of EIRP, an average value of the EIRP, a minimum value of the EIRP, an average value of TRP, and a minimum value of the TRP.

In an implementation, the receiving capability information includes at least one of following receiving capability indicators: a spherical coverage rate, a base station transmitting power corresponding to the spherical coverage rate, an average value of TIS, and a minimum value of the TIS.

Figure 11:
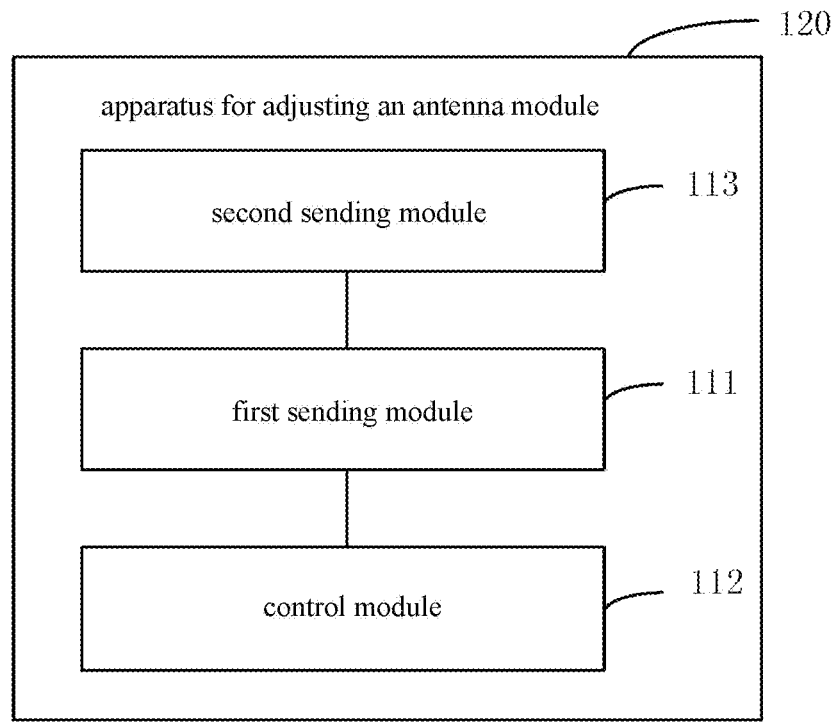
FIG. 11 is a block diagram showing an apparatus for adjusting an antenna module according to an exemplary embodiment.

FIG. 11 is a block diagram showing an apparatus for adjusting an antenna module according to an exemplary embodiment. As shown in FIG. 11, the apparatus 120 may further include a second sending module 113 on the basis of the apparatus 110. The second sending module 130 is configured to send information of an antenna module assembly of the terminal to the base station, wherein the antenna module assembly includes at least two antenna modules of the terminal.

In an implementation, the control module may be configured to: control an antenna module identified by a first identifier to work or stop working according to the first identifier of the antenna module indicated in the control signaling, or control at least one antenna module in the antenna module assembly identified by a second identifier to work or stop working according to the second identifier of the antenna module indicated in the control signaling.

Figure 12:
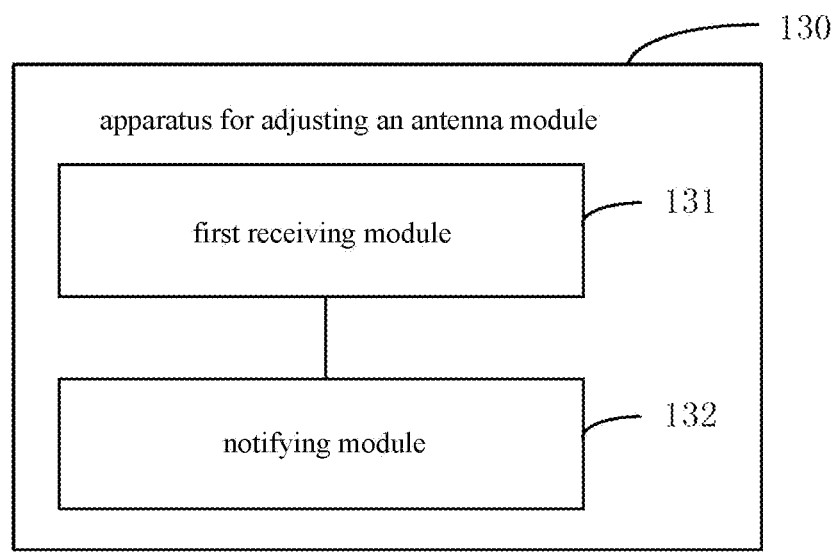
FIG. 12 is a block diagram showing an apparatus for adjusting an antenna module according to an exemplary embodiment.

FIG. 12 is a block diagram showing an apparatus for adjusting an antenna module according to an exemplary embodiment. The apparatus is applied to a base station. As shown in FIG. 12, the apparatus 130 includes:

- a first receiving module 131, configured to receive sending capability information of at least one antenna module of a terminal and/or receiving capability information of at least one antenna module of the terminal; and
- a notifying module 132, configured to notify the terminal to control at least one antenna module of the terminal to work or stop working according to the sending capability information and/or the receiving capability information, or adjust service data scheduled to a target frequency band according to the sending capability information and/or the receiving capability information.

In an implementation, the sending capability information includes at least one of following sending capability indicators: a peak value of EIRP, an average value of the EIRP, a minimum value of the EIRP, an average value of TRP, and a minimum value of the TRP.

In an implementation, the receiving capability information includes at least one of following receiving capability indicators: a spherical coverage rate, a base station transmitting power corresponding to the spherical coverage rate, an average value of TIS, and a minimum value of the TIS.

In an implementation, the notifying module is configured to: send a control signaling to the terminal, wherein the control signaling indicates a first identifier of an antenna module of the terminal and that the antenna module identified by the first identifier needs to work or stop working, or the control signaling indicates a second identifier of an antenna module assembly of the terminal and that at least one antenna module in the antenna module assembly identified by the second identifier needs to work or stop working.

In an implementation, the notifying module is configured to: notify the terminal to control at least one antenna module with the lowest preset priority in the terminal to stop working, when it is determined that a transmission capability of the terminal is higher than a threshold according to the sending capability information and/or the receiving capability information; notify the terminal to control at least one antenna module with the highest preset priority in the terminal to work, when it is determined that the transmission capability of the terminal is not higher than the threshold according to the sending capability information and/or the receiving capability information.

Figure 13:
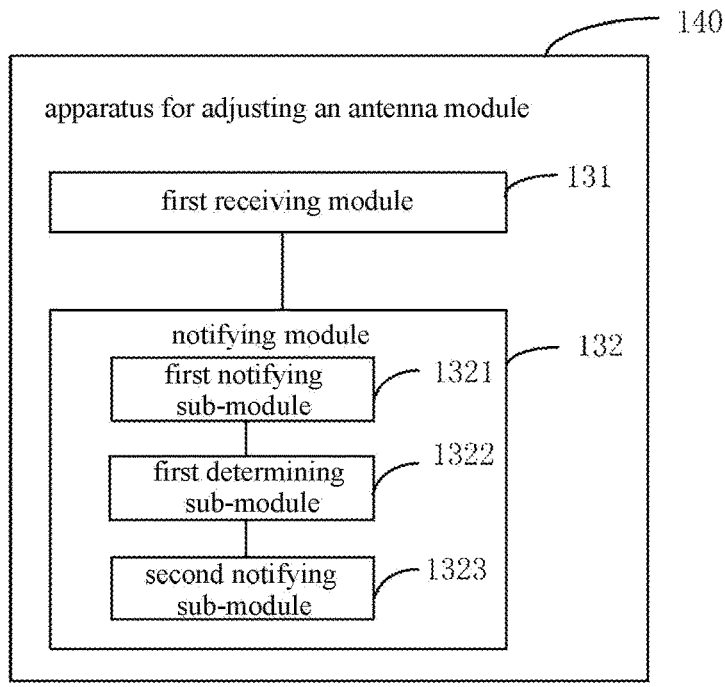
FIG. 13 is a block diagram showing an apparatus for adjusting an antenna module according to an exemplary embodiment.

FIG. 13 is a block diagram showing an apparatus for adjusting an antenna module according to an exemplary embodiment. As shown in FIG. 13, in the apparatus 140, the notifying module 132 may include: a first notifying sub-module 1321, configured to determine a data throughput of the terminal corresponding to each antenna module of the terminal according to the sending capability information and the receiving capability information; a first determining sub-module 1322, configured to determine a first antenna module that needs to work in the terminal according to a data amount of service data currently to be transmitted by the terminal and the data throughput of the terminal corresponding to each antenna module; a second notifying sub-module 1323, configured to notify the terminal to control the first antenna module to work.

Figure 14:
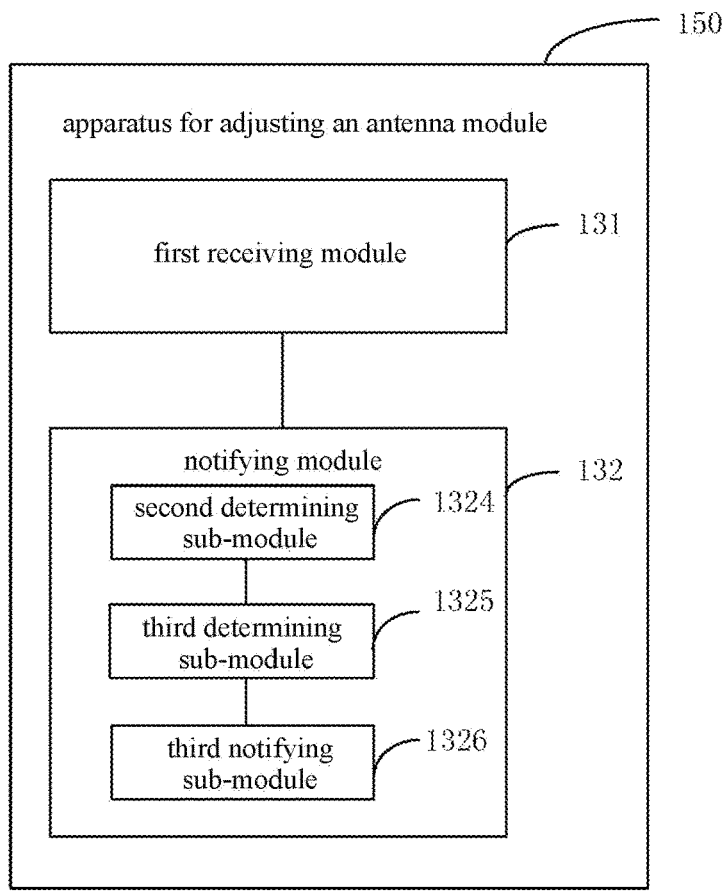
FIG. 14 is a block diagram showing an apparatus for adjusting an antenna module according to an exemplary embodiment.

FIG. 14 is a block diagram showing an apparatus for adjusting an antenna module according to an exemplary embodiment. As shown in FIG. 14, in the apparatus 150, the notifying module 132 may include: a second determining sub-module 1324, configured to determine a coverage capability corresponding to each antenna module of the terminal according to the receiving capability information; a third determining sub-module 1325, configured to determine a second antenna module that needs to work in the terminal according to a coverage capability required by an operator corresponding to a service currently performed by the terminal and the coverage capability corresponding to each antenna module; a third notifying sub-module 1326, configured to notify the terminal to control the second antenna module to work.

Figure 15:
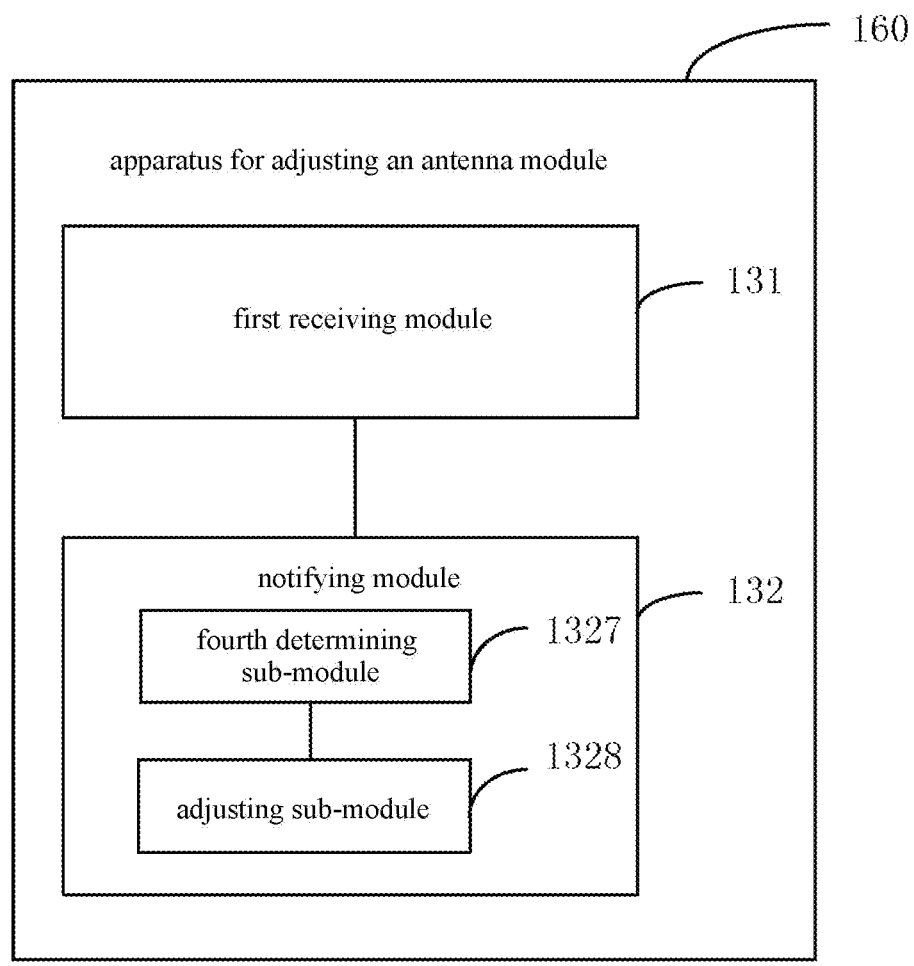
FIG. 15 is a block diagram showing an apparatus for adjusting an antenna module according to an exemplary embodiment.

FIG. 15 is a block diagram showing an apparatus for adjusting an antenna module according to an exemplary embodiment. As shown in FIG. 15, in the apparatus 160, the notifying module 132 may include: a fourth determining sub-module 1327, configured to determine a service carrying capability of each antenna module of the terminal according to the sending capability information and/or the receiving capability information; an adjusting sub-module 1328, configured to increase or decrease a data amount of the service data scheduled to the target frequency band corresponding to the antenna module according to the service carrying capability of each antenna module.

Regarding the apparatus in the foregoing embodiment, the specific manner in which each module performs operation has been described in detail in the embodiment of the method, and detailed description will not be given herein.

Figure 16:
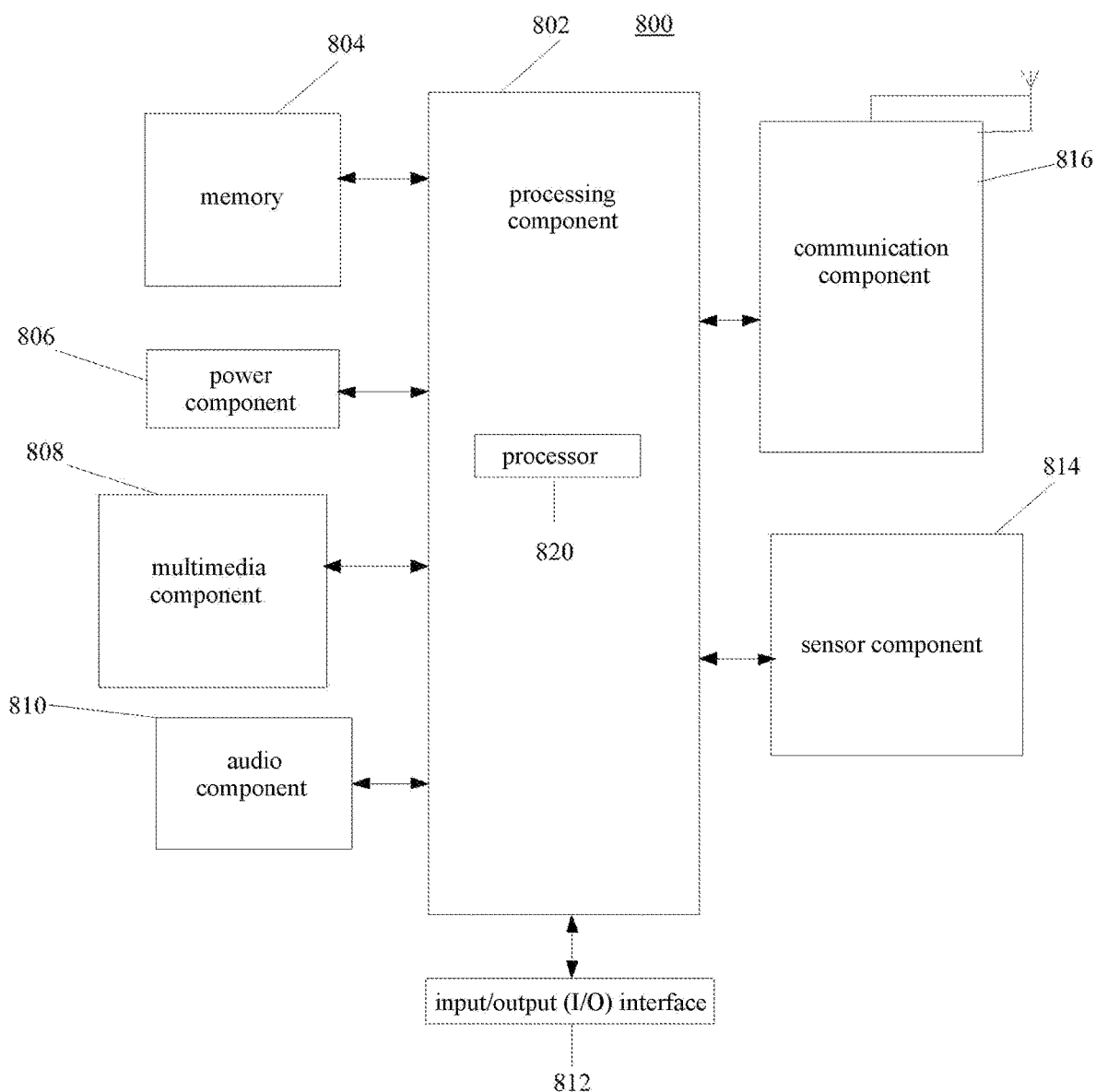
FIG. 16 is a block diagram showing an apparatus for adjusting an antenna module according to an exemplary embodiment.

FIG. 16 is a block diagram showing an apparatus for adjusting an antenna module according to an exemplary embodiment. For example, the apparatus 800 may be a mobile phone, a computer, a digital broadcasting terminal, a messaging device, a game console, a tablet device, a medical device, a fitness device, a personal digital assistant, or the like.

Referring to FIG. 16, the apparatus 800 may include one or more of the following components: a processing component 802, memory 804, a power component 806, a multimedia component 808, an audio component 810, an input/output (I/O) interface 812, a sensor component 814, and a communication component 816.

The processing component 802 typically controls the overall operations of the apparatus 800, such as the operations associated with display, telephone calls, data communications, camera operations, and recording operations. The processing component 802 can include one or more processors 820 to execute instructions to perform all or part of the steps in the above-described methods. Moreover, the processing component 802 can include one or more modules to facilitate the interaction between the processing component 802 and other components. For example, the processing component 802 can include a multimedia module to facilitate the interaction between the multimedia component 808 and the processing component 802.

The memory 804 is configured to store various types of data to support the operation of the apparatus 800. Examples of such data include instructions for any application or method operated on the apparatus 800, such as the contact data, the phone book data, messages, pictures, videos, and the like. The memory 804 can be implemented by any type of volatile or non-volatile storage device, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 can include a power management system, one or more power sources, and other components associated with the generation, management, and distribution of power in the apparatus 800.

The multimedia component 808 includes a screen providing an output interface between the apparatus 800 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. When the apparatus 800 is in an operation mode, such as a photographing mode or a video mode, the front camera and/or the rear camera can receive external multimedia data. Each of the front camera and the rear camera may be a fixed optical lens system or have focus and optical zoom capability.

The audio component 810 is configured to output and/or input an audio signal. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or sent via the communication component 816. In some embodiments, the audio component 810 also includes a speaker for outputting the audio signal.

The I/O interface 812 provides an interface between the processing component 802 and peripheral interface modules, such as a keyboard, a click wheel, buttons, and the like. These buttons may include, but not limited to, a home button, a volume button, a starting button, and a locking button.

The sensor component 814 includes one or more sensors for providing state assessments of various aspects of the apparatus 800. For example, the sensor component 814 can detect an open/closed state of the apparatus 800, relative positioning of components, such as the display and the keypad of the apparatus 800. The sensor component 814 can also detect a change in position of one component of the apparatus 800 or the apparatus 800, the presence or absence of user contact with the apparatus 800, an orientation, or an acceleration/deceleration of the apparatus 800, and a change in temperature of the apparatus 800. The sensor component 814 can also include a proximity sensor configured to detect the presence of nearby objects without any physical contact. The sensor component 814 can also include a light sensor, such as a CMOS or CCD image sensor, configured to use in imaging applications. In some embodiments, the sensor component 814 can also include an accelerometer sensor, a gyroscope sensor, a magnetic sensor, a pressure sensor, or a temperature sensor.

The communication component 816 is configured to facilitate wired or wireless communication between the apparatus 800 and other devices. The apparatus 800 can access a wireless network based on a communication standard, such as Wi-Fi, 2G, 3G or a combination thereof. In an exemplary embodiment, the communication component 816 receives broadcast signals or broadcast associated information from an external broadcast management system via a broadcast channel. In an exemplary embodiment, the communication component 816 also includes a near field communication (NFC) module to facilitate short-range communications. For example, the NFC module can be implemented based on radio frequency identifier (RFID) technology, infrared data association (IrDA) technology, ultra-wideband (UWB) technology, Bluetooth (BT) technology and other technologies.

In an exemplary embodiment, the apparatus 800 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the above methods.

In an exemplary embodiment, there is also provided a non-transitory computer-readable storage medium including instructions, such as memory 804 including instructions executable by the processor 820 of the apparatus 800 to perform the above methods. For example, the non-transitory computer readable storage medium may be a ROM, a random-access memory (RAM), a CD-ROM, a magnetic tape, a floppy disc, and an optical data storage device, or the like.

Figure 17:
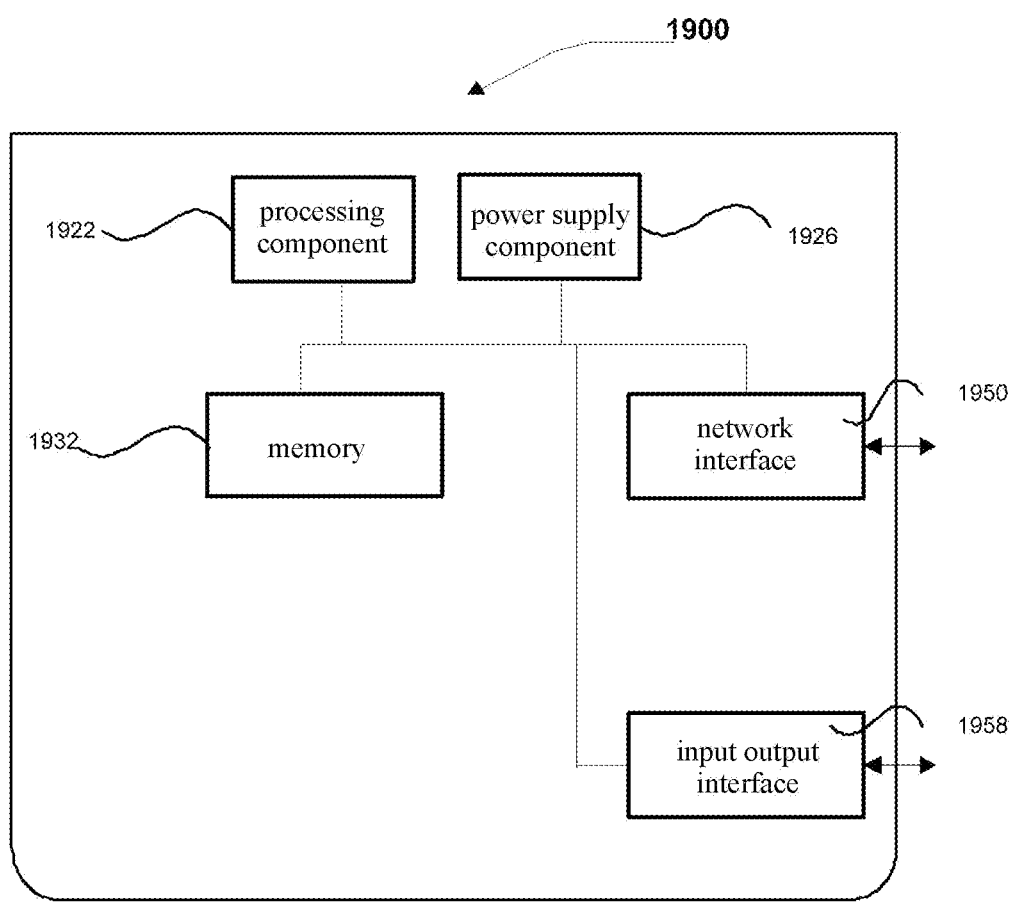
FIG. 17 is a block diagram showing an apparatus for adjusting an antenna module according to an exemplary embodiment.

FIG. 17 is a block diagram showing an apparatus for adjusting an antenna module according to an exemplary embodiment. For example, the apparatus 1900 may be provided as a server. Referring to FIG. 17, the apparatus 1900 includes a processing component 1922, which further includes one or more processors, and memory resource represented by memory 1932 for storing instructions executable by the processing component 1922, such as application programs. The application program stored in the memory 1932 may include one or more modules each corresponding to a set of instructions. In addition, the processing component 1922 is configured to execute instructions to execute the methods for adjusting the antenna module described above.

The apparatus 1900 may also include a power supply component 1926 configured to perform power management of the apparatus 1900, a wired or wireless network interface 1950 configured to connect the apparatus 1900 to a network, and an input output (I/O) interface 1958. The apparatus 1900 can operate an operating system stored in the memory 1932, such as WINDOWS SERVER™, MAC OS X™, UNIX™, LINUX™, FREEBSD™ or the like.

In an exemplary embodiment, there is also provided a non-transitory computer-readable storage medium including instructions, such as memory 1932 including instructions, which can be executed by the processing component 1922 of the apparatus 1900 to complete the foregoing methods. For example, the non-transitory computer-readable storage medium may be ROM, random access memory (RAM), CD-ROM, magnetic tape, floppy disk, optical data storage device, or the like.

Those skilled in the art will easily think of other embodiments of the present disclosure after considering the description and practicing the disclosure disclosed herein. This application is intended to cover any variations, uses, or adaptive changes of the present disclosure, which follow the general principles of the present disclosure and include common knowledge or conventional technical means in the technical field not disclosed in the present disclosure. The description and the embodiments are only regarded as exemplary, and the true scope and spirit of the present disclosure are indicated by the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. A method for adjusting a plurality of antenna modules of a terminal, wherein the method is performed by a base station and the method comprises:
    receiving sending capability information and receiving capability information of the plurality of antenna modules of the terminal;
    summing the sending capability information of the plurality of antenna modules of the terminal to thereby obtain sending capability of the terminal;
    summing the receiving capability information of the plurality of antenna modules of the terminals to thereby obtain receiving capability of the terminal;
    multiplying the sending capability of the terminal and the receiving capability of the terminal by corresponding weighted values respectively, wherein the sending capability of the terminal is a, the receiving capability of the terminal is b, a weighted value corresponding to a is Total Radiated Power (TRP), and a weight value corresponding to b is Total Isotropic Sensitivity (TIS);
    summing results of said multiplying to thereby obtain a weighted value a×TRP+b×TIS of the sending capability of the terminal and the receiving capability of the terminal;
    sending a control signaling to the terminal for adjusting one of the plurality of antenna modules according to the obtained weighted value;
    adjusting service data scheduled to a target frequency band according to the sending capability information and the receiving capability information of the terminal;
    wherein the control signaling indicates a first identifier of one of the plurality of antenna modules of the terminal to stop working as having a lowest preset priority, and a second identifier of another one of the plurality of antenna modules of the terminal to work as having a highest priority.

2. The method according to claim 1, wherein the sending capability information comprises at least one of following sending capability indicators:
    a peak value of Effective Isotropic Radiated Power EIRP, an average value of the EIRP, a minimum value of the EIRP, an average value of the TRP, and a minimum value of the TRP.

3. The method according to claim 1, wherein the receiving capability information comprises at least one of following receiving capability indicators:
    a spherical coverage rate, a base station transmitting power corresponding to the spherical coverage rate, an average value of the TIS, and a minimum value of the TIS.

4. The method according to claim 1, further comprising:
    notifying the terminal to control the one of the plurality of antenna modules with the lowest preset priority in the terminal to stop working, when it is determined that a transmission capability of the terminal is higher than a threshold according to the sending capability information and the receiving capability information; and
    notifying the terminal to control the other one of the plurality of antenna modules with the highest preset priority in the terminal to work, when it is determined that the transmission capability of the terminal is not higher than the threshold according to the sending capability information and the receiving capability information.

5. The method according to claim 1, further comprising:
    determining a data throughput of the terminal corresponding to each antenna module of the terminal according to the sending capability information and the receiving capability information;
    determining a first antenna module that needs to work in the terminal according to a data amount of service data currently to be transmitted by the terminal and the data throughput of the terminal corresponding to each antenna module; and
    notifying the terminal to control the first antenna module to work.

6. The method according to claim 1, further comprising:
    determining a coverage capability corresponding to each antenna module of the terminal according to the receiving capability information;
    determining a second antenna module that needs to work in the terminal according to a coverage capability required by an operator corresponding to a service currently performed by the terminal and the coverage capability corresponding to each antenna module; and
    notifying the terminal to control the second antenna module to work.

7. The method according to claim 1, wherein the adjusting service data comprises:
    determining a service carrying capability of each antenna module of the terminal according to the sending capability information and the receiving capability information; and
    increasing or decreasing a data amount of the service data scheduled to the target frequency band corresponding to the antenna module according to the service carrying capability of each antenna module.

8. An apparatus implementing the method according to claim 1, wherein the apparatus is applied to the base station and the apparatus comprises:
    a processor; and
    memory storing instructions executable by the processor;
    wherein the processor is configured to execute steps of the method.

9. The apparatus according to claim 8, wherein the processor is further configured to:
    determine a data throughput of the terminal corresponding to each antenna module of the terminal according to the sending capability information and the receiving capability information;
    determine a first antenna module that needs to work in the terminal according to a data amount of service data currently to be transmitted by the terminal and the data throughput of the terminal corresponding to each antenna module;
    notify the terminal to control the first antenna module to work.

10. The apparatus according to claim 8, wherein the processor is further configured to:
    determine a coverage capability corresponding to each antenna module of the terminal according to the receiving capability information;

determine a second antenna module that needs to work in the terminal according to a coverage capability required by an operator corresponding to a service currently performed by the terminal and the coverage capability corresponding to each antenna module;

notify the terminal to control the second antenna module to work.

* * * * *